US012596574B2

(12) United States Patent
Stringer et al.

(10) Patent No.: US 12,596,574 B2
(45) Date of Patent: Apr. 7, 2026

(54) RIGHT-SIZING RESOURCE REQUESTS BY APPLICATIONS IN DYNAMICALLY SCALABLE COMPUTING ENVIRONMENTS

(71) Applicant: Royal Bank of Canada, Toronto (CA)

(72) Inventors: Matthew Stringer, Hamilton (CA); Merissa Li, Surrey (CA); Kaveh Alemi, West Vancouver (CA); Ore Aminu, Toronto (CA); Venkatesan Packiriswamy, Jersey City, NJ (US); Manoj Agrawal, Jersey City, NJ (US); Vishal Mahajan, Toronto (CA)

(73) Assignee: Royal Bank Of Canada, Toronto (CA)

( * ) Notice: Subject to any disclaimer, the term of this patent is extended or adjusted under 35 U.S.C. 154(b) by 836 days.

(21) Appl. No.: 17/893,864

(22) Filed: Aug. 23, 2022

(65) Prior Publication Data

US 2023/0061641 A1 Mar. 2, 2023

Related U.S. Application Data

(60) Provisional application No. 63/237,831, filed on Aug. 27, 2021.

(51) Int. Cl.
G06F 9/50 (2006.01)
G06F 9/455 (2018.01)

(52) U.S. Cl.
CPC ........ G06F 9/5005 (2013.01); G06F 9/45558 (2013.01)

(58) Field of Classification Search
CPC ...................................................... G06N 20/00
See application file for complete search history.

(56) References Cited

U.S. PATENT DOCUMENTS

| | | | |
|---|---|---|---|
| 10,353,746 B2 | 7/2019 | Reque et al. | |
| 10,671,443 B1 * | 6/2020 | Ramachandran | ....... G06F 9/541 |
| 11,295,224 B1 * | 4/2022 | Huang | ................. G06F 9/5083 |
| 2013/0138816 A1 | 5/2013 | Kuo et al. | |
| 2015/0128053 A1 | 5/2015 | Bragstad et al. | |
| 2020/0089533 A1 * | 3/2020 | Guha | .................... G06F 9/5072 |
| 2021/0240517 A1 * | 8/2021 | Mohapatra | .............. G06F 9/445 |
| 2022/0147390 A1 * | 5/2022 | Akinapelli | .......... G06F 11/3433 |
| 2024/0111734 A1 * | 4/2024 | Agrawal | ............... G06F 16/211 |

* cited by examiner

*Primary Examiner* — Lewis A Bullock, Jr.
*Assistant Examiner* — Christian M Bakhit

(57) ABSTRACT

Methods, systems, and techniques for right-sizing resource requests for applications in a dynamically scalable computing environment. In one aspect, a method comprises monitoring resource usage of at least one computer resource by an application executing on a computer system, and monitoring resource requests for the computer resource(s) associated with the application. The method further comprises determining, for the computer resource(s), a resource usage upper bound associated with the application, testing the resource usage upper bound against at least one threshold, determining, from the testing, a resource request adjustment, and dynamically applying the resource request adjustment to the resource requests for the computer resource(s) associated with the application.

25 Claims, 6 Drawing Sheets

RIGHT-SIZING RESOURCE REQUESTS BY APPLICATIONS IN DYNAMICALLY SCALABLE COMPUTING ENVIRONMENTS

TECHNICAL FIELD

The present disclosure is directed at methods, systems, and computer-program products for right-sizing resource requests for applications in a dynamically scalable computing context.

BACKGROUND

In dynamically scalable computing contexts, for example cloud computing, resources such as physical processors and physical memory, among others, are shared among many applications. The applications may execute in containers (executable units of software in which application code is packaged, along with the necessary libraries and dependencies), or on virtual machines, where a hypervisor is used to virtualize physical hardware into "virtual machines" or "VMs", each of which includes, in addition to the application and its associated libraries and dependencies, a guest operating system (OS) along with a virtual copy of the hardware that the OS needs to run.

A user accessing dynamically scalable computing systems will request resources based on the expected needs of the application that they intend to run. However, estimating these needs can be challenging, and may result in an overestimate or underestimate of the required resources. In cases where cloud computing resources are provided by a third party vendor, an overestimate may result in the user paying for resources that they do not actually need, and an underestimate may inhibit operation of the application, or incur additional fees for increasing resource allocation in real time. Even when the dynamically scalable computing resources are internal in a private cloud (e.g. the party running the application is part of the same organization that provides the computing system), incorrect estimates can result in inefficiency, misallocation of resources, latency and unnecessary cost.

SUMMARY

According to a first aspect, there is provided a method for right-sizing resource requests for applications in a dynamically scalable computing environment. The method comprises monitoring resource usage of at least one computer resource by an application executing on a computer system, and monitoring resource requests for the computer resource(s) associated with the application. The method further comprises determining, for the computer resource(s), a resource usage upper bound associated with the application, testing the resource usage upper bound against at least one threshold, determining, from the testing, a resource request adjustment, and dynamically applying the resource request adjustment to the resource requests for the computer resource(s) associated with the application.

In some embodiments, the resource request adjustment is applied automatically. In other embodiments, the resource request adjustment is applied in response to a user confirmation.

The method may further comprise evaluating performance of the resource request adjustment as applied to the resource requests, and dynamically modifying at least one of the threshold and the resource usage upper bound based on the performance of the resource request adjustment as applied to the resource requests. In some embodiments, modifying at least one of the threshold and the resource usage upper bound based on the performance of the resource request adjustment as applied to the resource requests is performed by machine learning. In particular embodiments, evaluating performance of the resource request adjustment as applied to the resource requests and modifying at least one of the threshold and the resource usage upper bound based on the performance of the resource request adjustment as applied to the resource requests is carried out recursively.

In some embodiments, the threshold is determined by machine learning.

The computer resource(s) may include at least one of central processing unit (CPU) resource, memory resource, network utilization, disk I/O, graphical processing unit (GPU) uses and database usage.

In some embodiments, determining, for the at least one computer resource(s), a resource usage upper bound associated with the application comprises testing whether, during a predetermined time period, there have been a predetermined number of instances where the resource usage of the computer resource by the application has exceeded a mean of the resource usage of the computer resource by the application plus a predetermined number of standard deviations of the resource usage of the computer resource by the application, responsive to a determination that there have been a predetermined number of instances where the resource usage of the computer resource by the application has exceeded a mean of the resource usage of the computer resource by the application plus a predetermined number of standard deviations of the resource usage of the computer resource by the application, setting the resource usage upper bound to a first predetermined percentage of a maximum resource usage of the computer resource by the application, and responsive to a determination that there have not been a predetermined number of instances where the resource usage has exceeded a mean of the resource usage of the computer resource by the application plus a predetermined number of standard deviations of the resource usage of the computer resource by the application, setting the resource usage upper bound to a second predetermined percentage of the mean of the resource usage of the computer resource by the application.

In some embodiments, testing the resource usage upper bound against at least one threshold derived from the resource requests comprises testing whether the resource usage upper bound divided by a mean of the resource requests exceeds a first predetermined value, responsive to a determination that the resource usage upper bound divided by the mean of the resource requests exceeds the first predetermined value, testing whether the resource usage upper bound divided by the mean of the resource requests exceeds a second predetermined value that is greater than the first predetermined value by more than a third predetermined value, and responsive to a determination that the resource usage upper bound divided by the mean of the resource requests fails to exceed the first predetermined value, testing whether subtracting the resource usage upper bound divided by the mean of the resource requests from a fourth predetermined value yields a result that exceeds a fifth predetermined value.

In some embodiments, determining, from the testing, the resource request adjustment comprises, responsive to a determination that the resource usage upper bound divided by the mean of the resource requests exceeds the second predetermined value by more than the third predetermined value, setting the resource request adjustment to increase the resource requests, responsive to a determination that subtracting the resource usage upper bound divided by the mean of the resource requests from the fourth predetermined value yields a result that exceeds the fifth predetermined value, setting the resource request adjustment to decrease the resource requests, responsive to a determination that the resource usage upper bound divided by the mean of the resource requests fails to exceed the second predetermined value by more than the third predetermined value, setting the resource request adjustment to leave the resource requests unchanged, and responsive to a determination that subtracting the resource usage upper bound divided by the mean of the resource requests from the fourth predetermined value yields a result that fails to exceed the fifth predetermined value, setting the resource request adjustment to leave the resource requests unchanged.

In some embodiments, setting the resource request adjustment to increase the resource requests comprises setting the resource request adjustment to increase the resource requests by a percentage equal to 100% multiplied by the lesser of (a) a sixth predetermined value and (b) a seventh predetermined value subtracted from the resource usage upper bound divided by the mean of the resource requests.

In some embodiments, setting the resource request adjustment to decrease the resource requests comprises setting the resource request adjustment to decrease the resource requests by a percentage equal to 100% multiplied by the lesser of (a) an eighth predetermined value and (b) the resource usage upper bound divided by the mean of the resource requests subtracted from a ninth predetermined value.

In some embodiments, the application may be a containerized application. In other embodiments, the application may be a virtual machine application.

In other aspects, the present disclosure is directed to a method for right-sizing resource requests for applications in a dynamically scalable computing environment, wherein the method comprises monitoring, by a trained machine learning engine, resource usage of at least one computer resource by an application executing on a computer system, monitoring, by the trained machine learning engine, resource requests for the computer resource(s) associated with the application, determining, by the trained machine learning engine, a resource request adjustment, and dynamically applying the resource request adjustment to the resource requests for the computer resource(s) associated with the application.

In further aspects, the present disclosure is directed to data processing systems and computer program products for implementing the above methods.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

In at least some embodiments herein, methods, systems, and computer program products are described for a predictive analytics engine that derives right-sizing recommendations for applications in a dynamically scalable computing context, such as a public or private cloud infrastructure.

Figure 1:
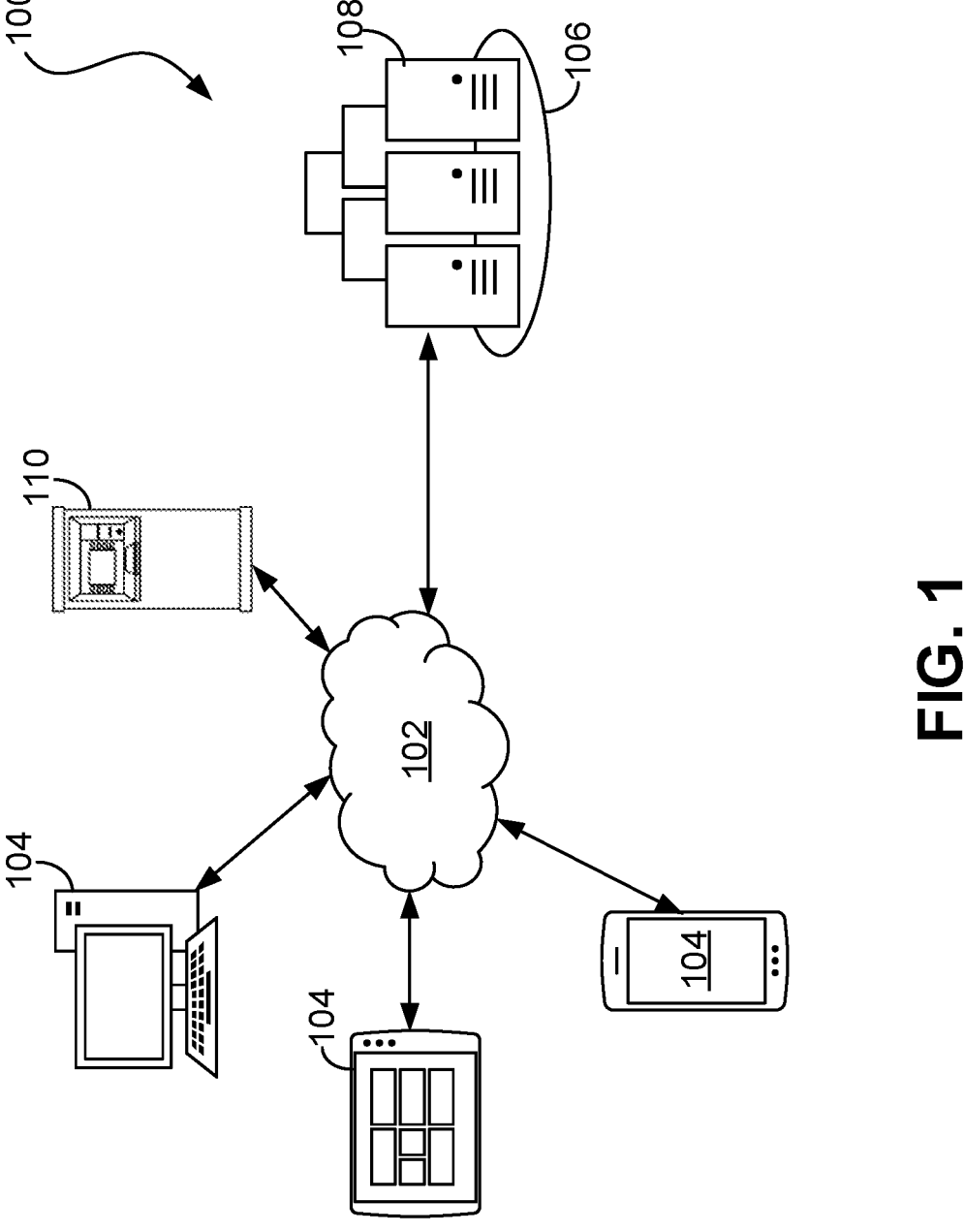
FIG. 1 shows an example embodiment of a system for right-sizing resource requests for applications in a dynamically scalable computing context including a data center.

Referring now to FIG. 1, there is shown a computer network 100 that comprises an example embodiment of a system for right-sizing resource requests for applications in a dynamically scalable computing context. More particularly, the computer network 100 comprises a wide area network 102 such as the Internet to which various user devices 104, an ATM 110, and data center 106 are communicatively coupled. The data center 106 comprises a number of servers 108 networked together to collectively perform various computing functions. For example, in the context of a financial institution such as a bank, the data center 106 may host online banking services that permit users to log in to those servers using user accounts that give them access to various computer-implemented banking services, such as online fund transfers. Furthermore, individuals may appear in person at the ATM 110 to withdraw money from bank accounts controlled by the data center 106. Additionally, the data center 106 may provide dynamically scalable computing services to internal users, such as investment bankers running various processes to assess risk and predict performance of financial instruments, and/or may provide cloud computing services to external users.

Figure 2:
FIG. 2 depicts an example embodiment of a server in the data center of FIG. 1.
Figure 2:
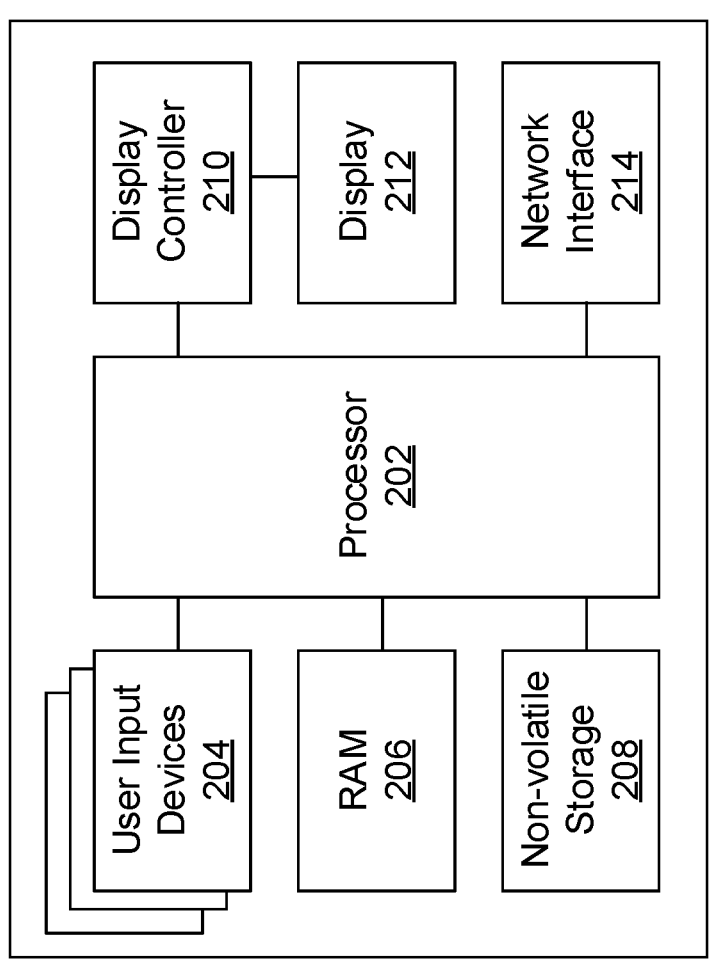

Referring now to FIG. 2, there is depicted an example embodiment of one of the servers 108 that comprises the data center 106. The server comprises a processor 202 that controls the server's 108 overall operation. The processor 202 is communicatively coupled to and controls several subsystems. These subsystems comprise user input devices 204, which may comprise, for example, any one or more of a keyboard, mouse, touch screen, voice control; random access memory ("RAM") 206, which stores computer program code for execution at runtime by the processor 202; non-volatile storage 208, which stores the computer program code executed by the processor 202 at runtime; a display controller 210, which is communicatively coupled to and controls a display 212; and a network interface 214, which facilitates network communications with the wide area network 102 and the other servers 108 in the data center 106. The non-volatile storage 208 has stored on it computer program code that is loaded into the RAM 206 at runtime and that is executable by the processor 202. When the computer program code is executed by the processor 202, the processor 202 causes the server 108 to implement a method for right-sizing resource requests for applications in a dynamically scalable computing context such as is described in more detail in respect of FIG. 3 below. Additionally or alternatively, the servers 108 may collectively perform that method using distributed computing. While the system depicted in FIG. 2 is described specifically in respect of one of the servers 108, analogous versions of the system may also be used for the user devices 104.

Figure 3:
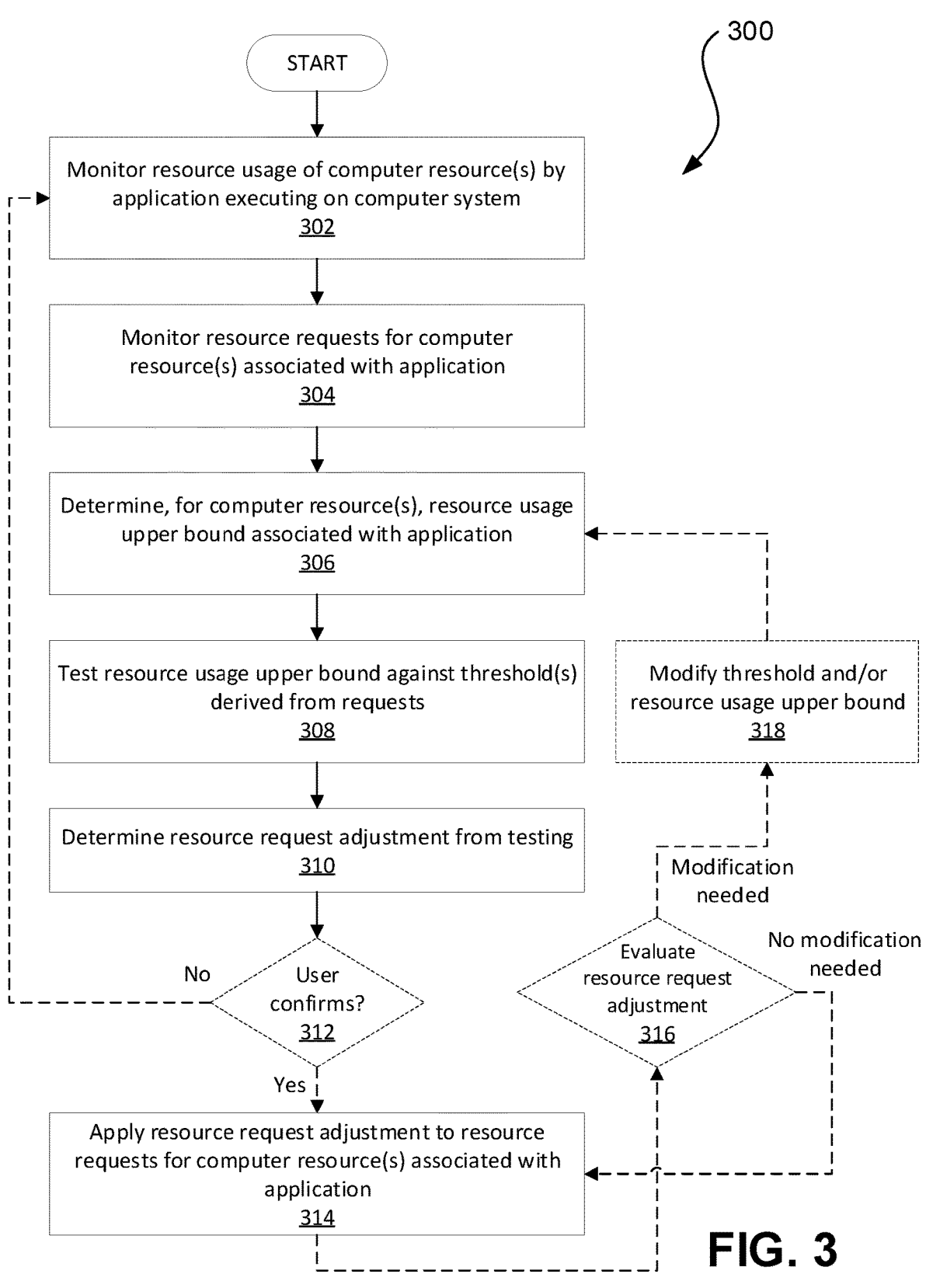
FIG. 3 shows a first illustrative method for right-sizing resource requests for dynamically scalable computing applications.

Reference is now made to FIG. 3, which shows a first illustrative method 300 for right-sizing resource requests for dynamically scalable computing applications according to an aspect of the present disclosure. At step 302, the method 300 monitors resource usage of at least one computer resource by an application executing on a computer system. The application may be, for example, a containerized application or a virtual machine (VM) application, among others. The resource usage monitored at step 302 may be one or more of CPU resource (number of cores or virtual cores), memory resource (gigabytes or fractions of gigabytes of memory), network utilization (bandwidth, which may be measured in gigabits per second or GBPS), disk I/O (which may be measured as I/O operations per second or IOPS), graphical processing unit (GPU) uses and database usage, among other resources. Any suitable cloud resource that can be measured can be incorporated into the monitoring at step 302. At step 304, the method 300 monitors resource requests for the computer resource(s) associated with the application. The resource requests may be for a specific quantity of a resource (e.g. two processing cores and two gigabytes of memory), or may provide a minimum value and a limit value (e.g. a minimum of two processing cores and a limit of four processing cores, and a minimum of two gigabytes of memory and a limit of four gigabytes of memory). Steps 302 and 304 may be carried out in reverse order, or substantially simultaneously.

At step 306, the method 300 determines, for at least one of the computer resource(s), a resource usage upper bound associated with the application. Of note, the resource usage upper bound determined at step 306 is not necessarily the actual maximum resource usage of the application, and in many cases will be different from the actual maximum resource usage of the application. Similarly, in cases where the resource requests include a limit value, the resource usage upper bound determined at step 306 is not necessarily the limit value, and will often differ from the limit value for that resource.

At step 308, for each of the resource usage upper bounds, the method 300 tests the resource usage upper bound against one or more respective thresholds. Then, at step 310, the method 300 determines, from the testing at step 308, a resource request adjustment for each respective resource.

At optional decision block 312, the resource request adjustment(s) may be presented to a user for confirmation. In this embodiment, in response to a user confirmation ("yes" at decision block 312), the method 300 proceeds to step 314 to dynamically apply the resource request adjustment(s) to the resource requests for the computer resource(s) associated with the application. For example, the resource request adjustment may be applied to provide a downward adjustment to resource requests for a particular resource where the associated resource requests are significantly higher than actual resource usage for that resource, and vice versa. However, if the user declines the resource request adjustment(s) ("no" at decision block 312) then the method 300 does not, on that iteration, apply the resource request adjustment(s) to the resource requests for the computer resource(s) associated with the application. Instead, the method 300 returns to step 302 to resume monitoring.

Alternatively, the user confirmation decision block 312 may be omitted, and the method 300 may proceed directly to step 314 from step 310, such that the resource request adjustment(s) will be applied automatically.

In preferred embodiments, the method 300 is carried out continuously and recursively. In one optional but particularly preferred implementation, after step 314 the method 300 proceeds to decision block 316 to evaluate performance of the resource request adjustment as applied to the resource requests. For example, the evaluation at block 316 may assess whether at least one performance metric for the application has improved as a result of applying the resource request adjustment(s). If the method 300 determines at decision block 316 that no modification is needed, the method 300 returns to step 314 to continue applying the current resource request adjustment(s). If it is determined at decision block 316 that modification is required (for example, if the resource request adjustment as applied to the resource requests has failed to improve, or even worsened, one or more performance metrics), the method 300 proceeds to step 318. At step 318, the method 300 modifies at least one of the threshold and the resource usage upper bound, based on the performance of the resource request adjustment as applied to the resource requests. In embodiments where the resource usage upper bound and the threshold are determined formulaically, the modification may take the form of modification of the formula parameters. In other embodiments, modification of the threshold and/or the resource usage upper bound(s) based on the performance of the resource request adjustment as applied to the resource requests may be performed using non-formulaic approaches. Notably, the modification of the threshold and/or the resource usage upper bound(s) is dynamic. Thus, after step 318 the method 300 returns to step 306 to determine an updated resource usage upper bound for each computer resource according to the modified threshold and/or resource usage upper bound(s), and then to step 308 to test the modified resource usage upper bound(s) against the respective modified threshold(s).

Regardless of whether a particular iteration of decision block 316 determines that modification is required, from step 316 the method 300 will (assuming user confirmation at decision block 312, when present) return to step 314, either directly ("no modification needed" at decision block 316) or indirectly through steps 318, and then steps 306 through 312 ("modification needed" at decision block 316). Step 314, in turn, continues to decision block 316 for evaluation of the performance of the resource request adjustment(s) as applied to the resource requests. Of note, steps 314 and 316 will continue to iterate as long as no modification of the threshold and/or resource usage upper bound is required; the resource request adjustment at step 314 continues to be applied until step 316 determines that adjustment is needed. Thus, evaluating performance of the resource request adjustment(s) as applied to the resource requests and dynamically modifying the threshold(s) and/or the resource usage upper bound(s) based on the performance of the resource request adjustment(s) as applied to the resource requests is carried out recursively.

In some embodiments, determining the resource request adjustment(s) is carried out entirely procedurally, using formulaic calculations. Other embodiments may use other approaches.

One illustrative and non-limiting embodiment will now be described in which determination of the resource usage upper bound, testing against the threshold and determining the resource request adjustment(s) based on the testing are carried out procedurally, using formulaic calculations. While this embodiment is described for purposes of illustration, the methods described herein are not limited to procedural and formulaic approaches, and include other approaches, for example machine learning as described below.

Figure 4:
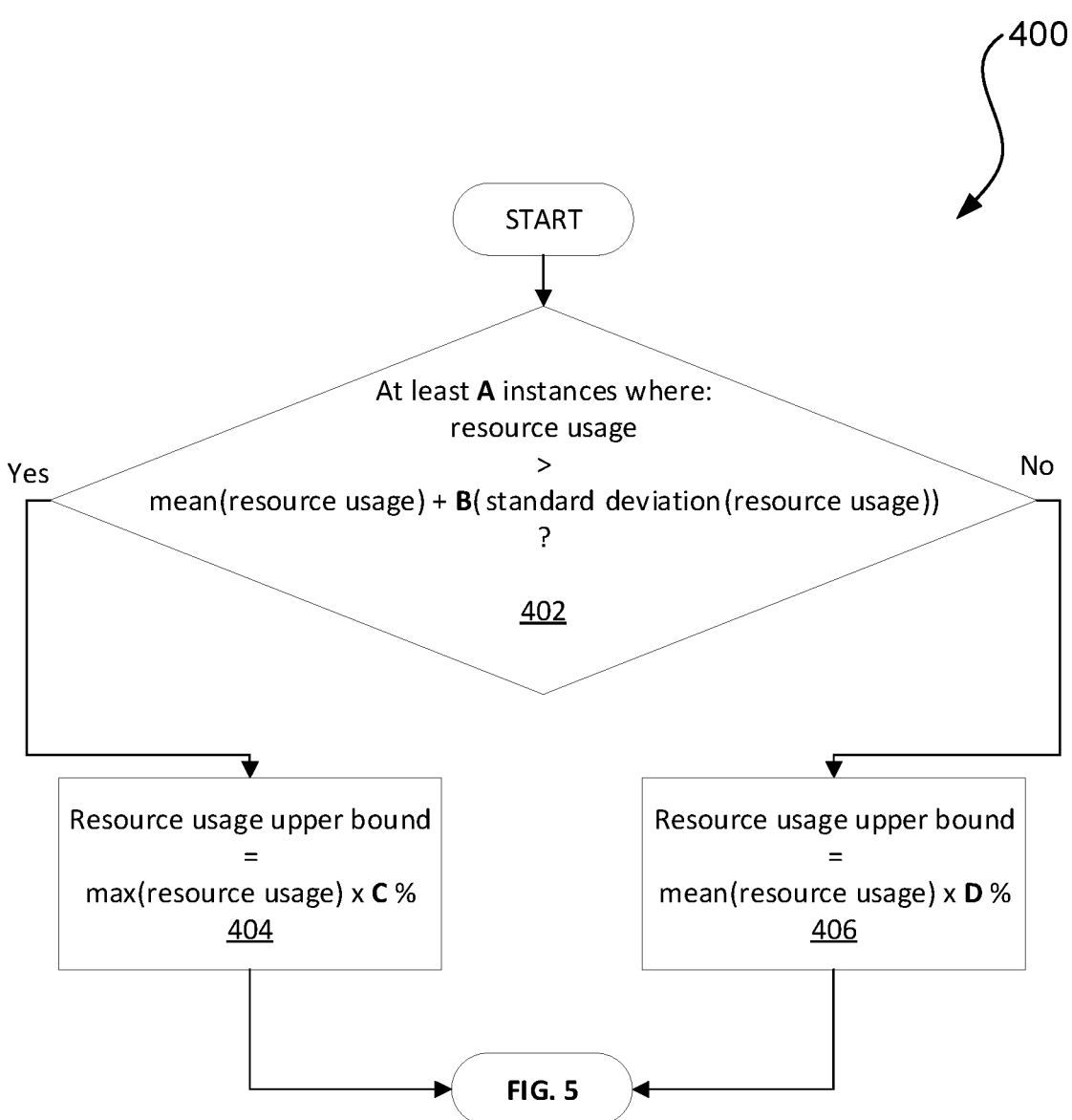
FIG. 4 shows an illustrative procedural method for determining a resource usage upper bound associated with an application.

Reference is now made to FIG. 4, which shows an illustrative procedural method 400 for determining a resource usage upper bound associated with the application. Thus, FIG. 4 is an illustrative, non-limiting implementation of step 306 of the method 300 shown in FIG. 3.

At step 402, the method 400 tests whether, during a predetermined time period, there have been a predetermined number A of instances where the resource usage has exceeded a mean of the resource usage of the computer resource by the application plus a predetermined number B of standard deviations of the resource usage of the computer resource by the application. In one embodiment, the predetermined number A of instances is three instances and the predetermined number B of standard deviations of the resource usage is one standard deviation, although other values may be used. Note that the predetermined number B of standard deviations of the resource usage may be any positive number, and need not be a whole number.

Responsive to a determination that there have been a predetermined number A of instances where the resource usage of the computer resource by the application has exceeded a mean of the resource usage of the computer resource by the application plus a predetermined number B of standard deviations of the resource usage of the computer resource by the application ("yes" at decision block 402) the method 400 proceeds to step 404. At step 404, the method 400 sets the resource usage upper bound to a first predetermined percentage C of the maximum resource usage of the computer resource by the application. Responsive to a determination that there have not been a predetermined number A of instances where the resource usage of the computer resource by the application has exceeded a mean of the resource usage of the computer resource by the application plus a predetermined number B of standard deviations of the resource usage of the computer resource by the application ("no" at decision block 402) the method 400 proceeds to step 406. At step 406, the method 400 sets the resource usage upper bound to a second predetermined percentage D of the mean of the resource usage of the computer resource by the application. In one embodiment, the value of C and D is 70 percent, although other values may be used. In some embodiments, the values of A, B, C and/or D may be modified dynamically, for example at step 318 of the method 300.

Figure 5:
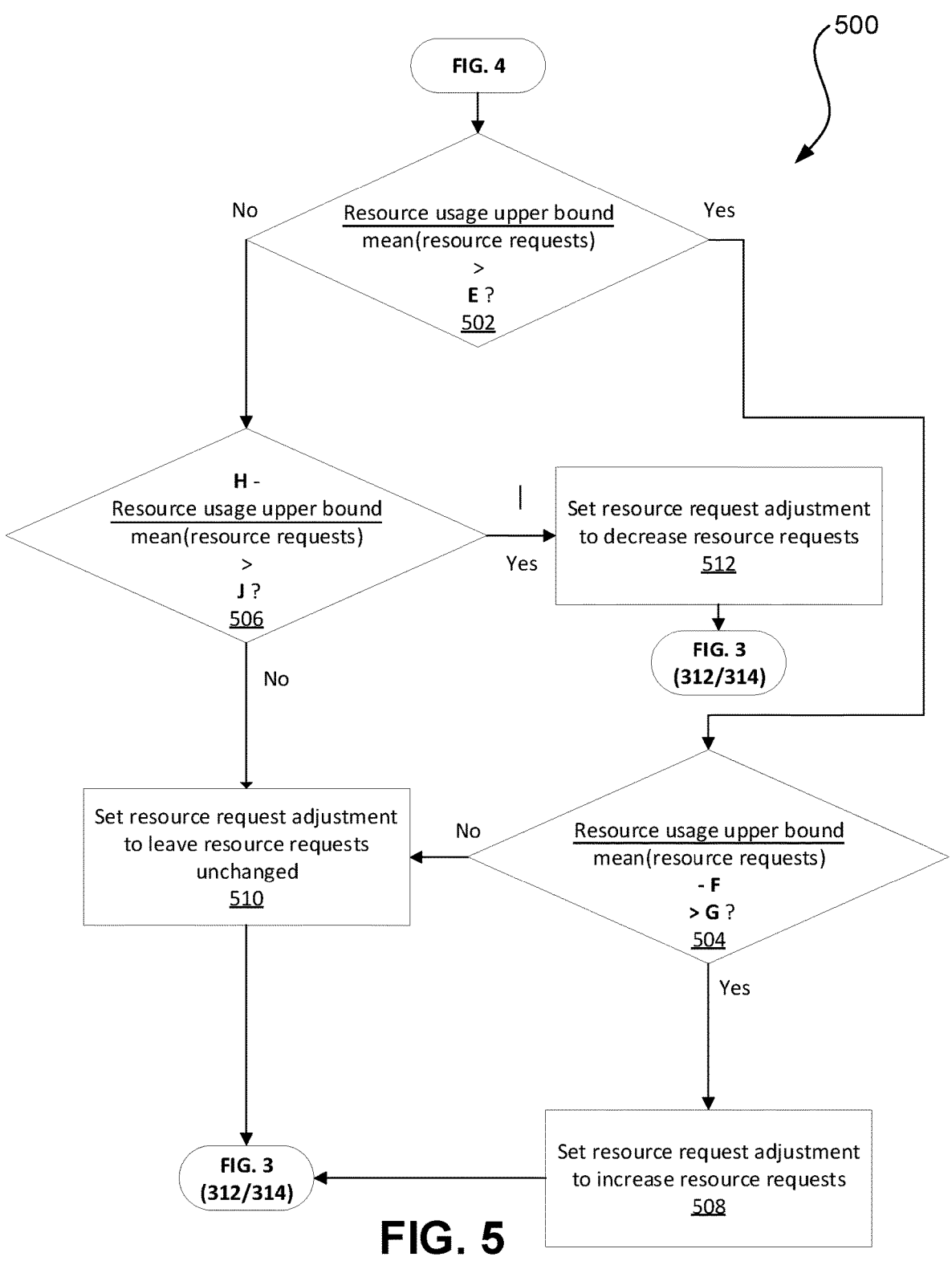
FIG. 5 shows an illustrative procedural method for testing the resource usage upper bound against at least one threshold derived from the resource requests and determining, from the testing, a resource request adjustment.

Reference is now made to FIG. 5, which shows an illustrative procedural method 500 for testing the resource usage upper bound against at least one threshold derived from the resource requests and determining, from the testing, the resource request adjustment. Thus, FIG. 5 is an illustrative, non-limiting implementation of steps 308 and 310 of the method 300 shown in FIG. 3.

At decision block 502, the method 500 tests whether the resource usage upper bound divided by a mean of the resource requests exceeds a first predetermined value E. In one embodiment, the value of E is 0.70, although other values may be used.

Responsive to a determination that the resource usage upper bound divided by the mean of the resource requests exceeds the first predetermined value E ("yes" at decision block 502), the method 500 proceeds to decision block 504. At decision block 504, the method 500 tests whether the resource usage upper bound divided by the mean of the resource requests exceeds a second predetermined value F that is greater than the first predetermined value E (i.e. F>E)

by more than a third predetermined value G. In one embodiment, the value of F is 0.90 and the value of G is 0.05, although other values may be used. Responsive to a determination that the resource usage upper bound divided by the mean of the resource requests fails to exceed the first predetermined value E ("no" at decision block 502), the method 500 proceeds to decision block 506. At decision block 506, the method 500 tests whether subtracting the resource usage upper bound divided by the mean of the resource requests from a fourth predetermined value H yields a result that exceeds a fifth predetermined value J. In one embodiment, the value of H is 0.70 and the value of J is 0.05, although other values may be used.

Responsive to a determination that the resource usage upper bound divided by the mean of the resource requests exceeds the second predetermined value F by more than the third predetermined value G ("yes" at decision block 504), the method 500 proceeds to step 508 and sets the resource request adjustment to increase the resource requests. Conversely, responsive to a determination that the resource usage upper bound divided by the mean of the resource requests fails to exceed the second predetermined value F by more than the third predetermined value G ("no" at decision block 504), the method 500 proceeds to step 510 and sets the resource request adjustment to leave the resource requests unchanged.

Responsive to a determination that subtracting the resource usage upper bound divided by the mean of the resource requests from the fourth predetermined value H yields a result that exceeds the fifth predetermined value J ("yes" at decision block 506), the method 500 proceeds to step 512 and sets the resource request adjustment to decrease the resource requests. Conversely, responsive to a determination that subtracting the resource usage upper bound divided by the mean of the resource requests from the fourth predetermined value H yields a result that fails to exceed the fifth predetermined value J ("no" at decision block 506), the method 500 proceeds to step 510 and sets the resource request adjustment to leave the resource requests unchanged.

In illustrative FIG. 5, there are a series of tests at steps 502, 504 and 506 in which the resource usage upper bound is tested against thresholds so as to determine resource request adjustment at steps 508, 510 and 512. Any of the values E, F, G, H and J may be modified dynamically, for example at step 318 of the method 300. Thus, in some embodiments, the threshold(s) may be derived from the resource requests.

The precise values of the resource request adjustments at steps 508 and 512 may be determined in a number of ways, for example procedurally, or dynamically, or by machine learning. In one non-limiting procedural embodiment, step 508 may set the resource request adjustment to increase the resource requests by a percentage equal to 100% multiplied by the lesser of (a) a sixth predetermined value K and (b) a seventh predetermined value L subtracted from the resource usage upper bound divided by the mean of the resource requests:

$$\min(((\text{resource usage upper bound}/\text{mean}(\text{resource requests}))-L),K)\times100\%.$$

In a particular embodiment, the sixth predetermined value K is 0.20 and the seventh predetermined value L is 0.90, although other values may also be used. Similarly, in one non-limiting procedural embodiment, step 512 may set the resource request adjustment to decrease the resource requests by a percentage equal to 100% multiplied by the lesser of (a) an eighth predetermined value M and (b) the resource usage upper bound divided by the mean of the resource requests subtracted from a ninth predetermined value N:

$$\min((N-(\text{resource usage upper bound}/\text{mean}(\text{resource requests}))),M)\times100\%$$

In a particular embodiment, the eighth predetermined value M is 0.20 and the ninth predetermined value N is 0.70, although other values may also be used.

Optionally, a performance score may be calculated for the application. In one embodiment, the performance score may be calculated by applying the method 400 shown in FIG. 4 (or a similar method) to determine a resource usage upper bound associated with the application, and then applying a scoring function that incorporates the resource usage upper bound. For example, in one embodiment, the scoring function may take the average of individual scores for individual resources (e.g. processing cores and memory). In one particular implementation, the individual score for each resource may be calculated as:

$$1-|(\text{resource usage upper bound}/\text{mean}(\text{resource requests}))-P|\times100\%$$

The subtrahend P may have any suitable value.

An overall score may be taken as the average of the individual scores. An overall score can provide a holistic metric to capture the efficiency of an application's resource utilization. Where an individual user is using more than one application, the scores for that user's applications may be aggregated (e.g. an average or weighted average) to produce an overall score for the user, or where each user uses only a single application, the score for the application will be the score for the user. The user scores may be ranked on a leaderboard, which may be presented online.

Additionally, users may be provided with the opportunity to query the analytics which lead to the the resource request adjustments.

Optionally, the direct cost effects of implementing the resource request adjustments may be tabulated and displayed, and recommended resource request adjustments may be classified according to criticality or expected impact and/or linked to higher lever Key Performance Indicators (KPIs) for an organization.

Additionally, as insight is gained from repeated analysis and development of resource request adjustments, machine learning or other methodologies may be deployed to make recommendations for new applications, based on their similarity to existing applications, for initial resource allocation and hosting locations. Examples of suitable machine learning techniques include, without limitation, neural networks and deep learning, or regression, among others.

In one particular machine learning embodiment, most aspects of the determination of the resource request adjustment(s) are carried out procedurally, but modification of the threshold and/or the resource usage upper bound(s) based on the performance of the resource request adjustment as applied to the resource requests (steps 316 and 318 in FIG. 3) is performed by application of machine learning using a suitably trained machine learning model.

In other embodiments, determination of the resource request adjustment(s) is carried out using a trained machine learning model. The untrained model can be provided with training data containing resource requests and actual resource usage, as well as other data determined to be relevant. Examples of other potentially relevant data may include, without limitation, temporal data (e.g. date and time of day), application data (e.g. the type of application, or the specific application, to which the resource request relates), user data (e.g. the type of user, or a specific individual), and location data (e.g. from where the request originates). The training data is preprocessed into an appropriate format for the machine learning model and used to train the model to generate resource request adjustment(s). The trained machine learning model may then be tuned, tested and (possibly after further tuning and testing) deployed.

Figure 6:
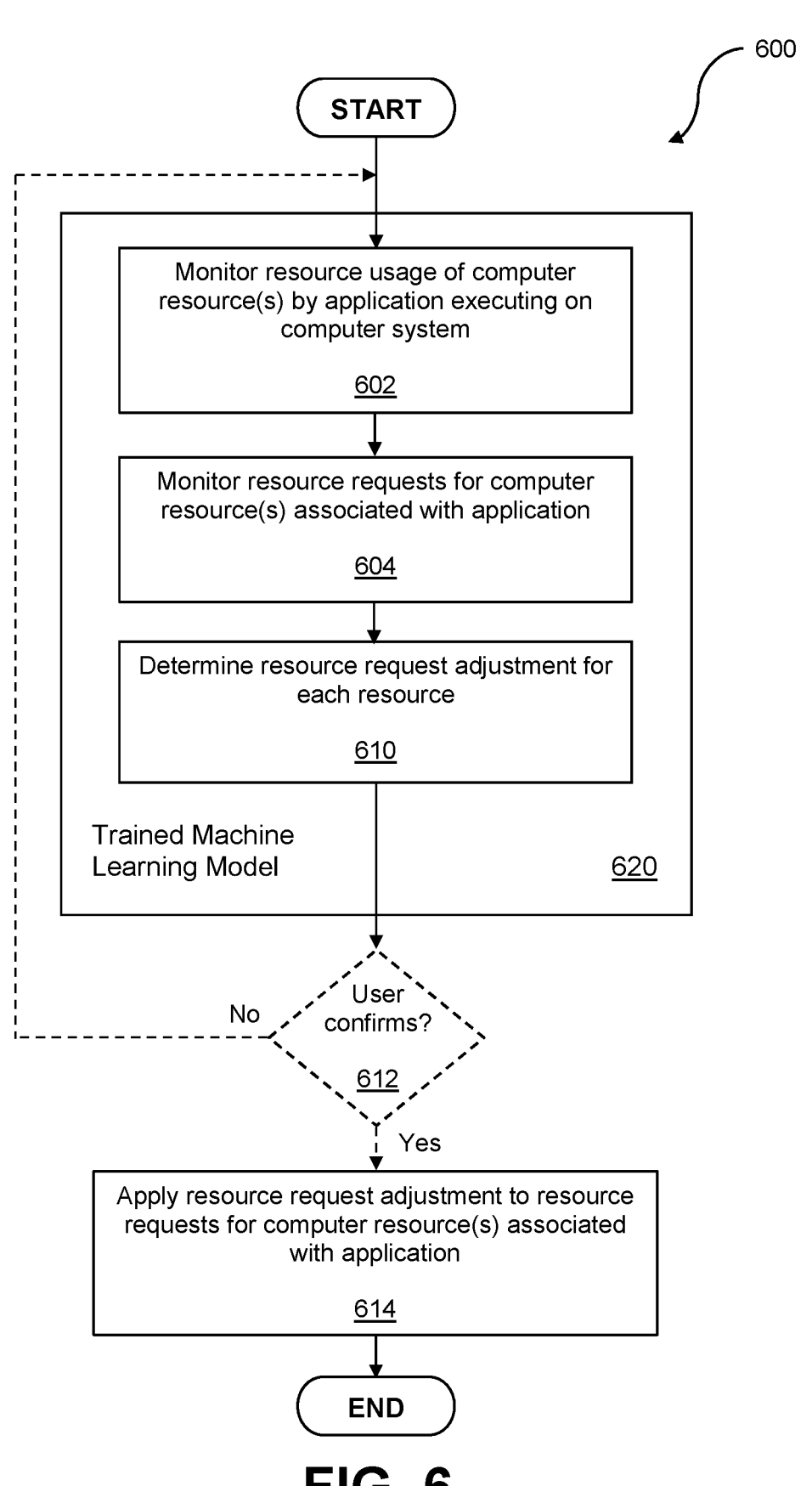
FIG. 6 shows a second illustrative method for right-sizing resource requests for dynamically scalable computing applications.

Reference is now made to FIG. 6, which shows a second illustrative method 600 for right-sizing resource requests for dynamically scalable computing applications according to an aspect of the present disclosure. At step 602, a trained machine learning model 620 monitors resource usage of at least one computer resource by an application executing on a computer system. Examples of applications include, but are not limited to, containerized applications and VM applications, and examples of monitored resource usage include, but are not limited to, one or more of CPU resource, memory resource, network utilization, disk I/O, GPU use and database use; any suitable cloud resource that can be measured and for which the machine learning model can be trained can be incorporated into the monitoring at step 602. At step 604, the trained machine learning model 620 monitors resource requests for the computer resource(s) associated with the application. The resource requests may, for example, specify a particular quantity of a resource or specify a range (minimum value and limit value). Steps 602 and 604 may be carried out in reverse order, or substantially simultaneously. At step 610, the trained machine learning model 620 determines a resource request adjustment for each respective resource. At optional decision block 612, the resource request adjustment(s) may be presented to a user for confirmation. In response to a user confirmation ("yes" at decision block 612), the method 600 proceeds to step 614 to dynamically apply the resource request adjustment(s) to the resource requests for the computer resource(s) associated with the application. However, if the user declines the resource request adjustment(s) ("no" at decision block 612) then the method 600 does not, on that iteration, apply the resource request adjustment(s) to the resource requests for the computer resource(s) associated with the application. Instead, the method 600 returns to step 602 to resume monitoring.

In some embodiments, the trained machine learning model may be updated, either continuously or periodically; such updating may be autonomous, semi-autonomous or manual. The updating may be risk-rated; for example less risky updates to the machine learning model may be implemented automatically while riskier updates may require manual implementation or approval. The risk-rating may be adjusted as confidence in the machine learning model grows.

As can be seen from the above description, the technology for right-sizing resource requests described herein represents significantly more than merely using categories to organize, store and transmit information and organizing information through mathematical correlations. The resource request right-sizing technology is in fact an improvement to the technology of dynamically scalable computing, such as cloud computing, as it provides for improved resource allocation. This facilitates increases in efficiency, and reductions in latency. Moreover, the resource request right-sizing technology is confined to dynamically scalable computing. As such, the resource request right-sizing technology described herein is by its nature a solution to a computer problem.

Aspects of the present technology, including logging and log analytics, infrastructure metrics and container monitoring, and application performance monitoring, may be implemented using Elasticsearch, which is offered by Elasticsearch B.V. and available at https://www.elastic.co/.

The processor used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a resource request adjustment" or "the resource request adjustment" does not exclude embodiments in which multiple resource request adjustments are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "X, Y, and/or Z" means "any one or more of X, Y, and Z".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computer-implemented method for right-sizing resource requests for applications in a dynamically scalable computing environment, the method comprising:

monitoring, by a computer system, resource usage of at least one computer resource by an application executing in the dynamically scalable computing environment;

monitoring, by the computer system, resource requests for the at least one computer resource associated with the application;

determining, by the computer system, for the at least one computer resource, a resource usage upper bound associated with the application;

testing, by the computer system, the resource usage upper bound against at least one threshold;

determining, by the computer system, from the testing, a resource request adjustment; and the computer system dynamically applying the resource request adjustment to the resource requests for the at least one computer resource associated with the application;

wherein determining, for the at least one computer resource, a resource usage upper bound associated with the application comprises:

testing whether, during a predetermined time period, there have been a predetermined number of instances where the resource usage has exceeded a mean of the resource usage of the computer resource by the application plus a predetermined number of standard deviations of the resource usage of the computer resource by the application;

responsive to a determination that there have been a predetermined number of instances where the resource usage has exceeded a mean of the resource usage of the computer resource by the application plus a predetermined number of standard deviations of the resource usage of the computer resource by the application, setting the resource usage upper bound to a first predetermined percentage of a maximum resource usage of the computer resource by the application; and responsive to a determination that there have not been a predetermined number of instances where the resource usage of the computer resource by the application has exceeded a mean of the resource usage of the computer resource by the application plus a predetermined number of standard deviations of the resource usage of the computer resource by the application, setting the resource usage upper bound to a second predetermined percentage of the mean of the resource usage of the computer resource by the application.

2. The method of claim 1, wherein the resource request adjustment is applied automatically to the resource requests absent human intervention to reduce latency.

3. The method of claim 1, further comprising:

evaluating performance of the resource request adjustment as applied to the resource requests; and dynamically modifying at least one of the threshold and the resource usage upper bound based on the performance of the resource request adjustment as applied to the resource requests.

4. The method of claim 3, wherein modifying at least one of the threshold and the resource usage upper bound based on the performance of the resource request adjustment as applied to the resource requests is performed by machine learning.

5. The method of claim 4, wherein evaluating performance of the resource request adjustment as applied to the resource requests and modifying at least one of the threshold and the resource usage upper bound based on the performance of the resource request adjustment as applied to the resource requests is carried out recursively.

6. The method of claim 1, wherein the threshold is determined by machine learning.

7. The method of claim 1, wherein the at least one computer resource includes at least one of CPU resource, memory resource, network utilization, disk I/O, graphical processing unit (GPU) uses and database usage.

8. The method of claim 1, wherein the application is a containerized application.

9. The method of claim 1, wherein the application is a virtual machine application.

10. The method of claim 1, wherein the resource usage upper bound is different from an actual maximum resource usage of the application.

11. The method of claim 1, wherein the resource requests include a limit value for the at least one computer resource, and wherein the resource usage upper bound differs from the limit value for the at least one computer resource.

12. The method of claim 1, wherein testing the resource usage upper bound against at least one threshold derived from the resource requests comprises:

testing whether the resource usage upper bound divided by a mean of the resource requests exceeds a first predetermined value;

responsive to a determination that the resource usage upper bound divided by the mean of the resource requests exceeds the first predetermined value, testing whether the resource usage upper bound divided by the mean of the resource requests exceeds a second predetermined value that is greater than the first predetermined value by more than a third predetermined value; and responsive to a determination that the resource usage upper bound divided by the mean of the resource requests fails to exceed the first predetermined value, testing whether subtracting the resource usage upper bound divided by the mean of the resource requests from a fourth predetermined value yields a result that exceeds a fifth predetermined value.

13. The method of claim 12, wherein determining, from the testing, the resource request adjustment comprises:

responsive to a determination that the resource usage upper bound divided by the mean of the resource requests exceeds the second predetermined value by more than the third predetermined value, setting the resource request adjustment to increase the resource requests;

responsive to a determination that subtracting the resource usage upper bound divided by the mean of the resource requests from the fourth predetermined value yields a result that exceeds the fifth predetermined value, setting the resource request adjustment to decrease the resource requests;

responsive to a determination that the resource usage upper bound divided by the mean of the resource requests fails to exceed the second predetermined value by more than the third predetermined value, setting the resource request adjustment to leave the resource requests unchanged; and responsive to a determination that subtracting the resource usage upper bound divided by the mean of the resource requests from the fourth predetermined value yields a result that fails to exceed the fifth predetermined value, setting the resource request adjustment to leave the resource requests unchanged.

14. The method of claim 13, wherein setting the resource request adjustment to increase the resource requests comprises setting the resource request adjustment to increase the resource requests by a percentage equal to 100% multiplied by the lesser of (a) a sixth predetermined value and (b) a seventh predetermined value subtracted from the resource usage upper bound divided by the mean of the resource requests.

15. The method of claim 13, wherein setting the resource request adjustment to decrease the resource requests comprises setting the resource request adjustment to decrease the resource requests by a percentage equal to 100% multiplied by the lesser of (a) an eighth predetermined value and (b) the resource usage upper bound divided by the mean of the resource requests subtracted from a ninth predetermined value.

16. A data processing system comprising at least one processor and memory coupled to the at least one processor, wherein the memory contains instructions which, when implemented by the at least one processor, cause the at least one processor to perform a method comprising:

monitoring, by a computer system, resource usage of at least one computer resource by an application executing in the dynamically scalable computing environment;

monitoring, by the computer system, resource requests for the at least one computer resource associated with the application;

determining, by the computer system, for the at least one computer resource, a resource usage upper bound associated with the application;

testing, by the computer system, the resource usage upper bound against at least one threshold;

determining, by the computer system, from the testing, a resource request adjustment; and the computer system dynamically applying the resource request adjustment to the resource requests for the at least one computer resource associated with the application;

wherein determining, for the at least one computer resource, a resource usage upper bound associated with the application comprises:

testing whether, during a predetermined time period, there have been a predetermined number of instances where the resource usage has exceeded a mean of the resource usage of the computer resource by the application plus a predetermined number of standard deviations of the resource usage of the computer resource by the application;

responsive to a determination that there have been a predetermined number of instances where the resource usage has exceeded a mean of the resource usage of the computer resource by the application plus a predetermined number of standard deviations of the resource usage of the computer resource by the application, setting the resource usage upper bound to a first predetermined percentage of a maximum resource usage of the computer resource by the application; and responsive to a determination that there have not been a predetermined number of instances where the resource usage of the computer resource by the application has exceeded a mean of the resource usage of the computer resource by the application plus a predetermined number of standard deviations of the resource usage of the computer resource by the application, setting the resource usage upper bound to a second predetermined percentage of the mean of the resource usage of the computer resource by the application.

17. The data processing system of claim 16, wherein testing the resource usage upper bound against at least one threshold derived from the resource requests comprises:

testing whether the resource usage upper bound divided by a mean of the resource requests exceeds a first predetermined value;

responsive to a determination that the resource usage upper bound divided by the mean of the resource requests exceeds the first predetermined value, testing whether the resource usage upper bound divided by the mean of the resource requests exceeds a second predetermined value that is greater than the first predetermined value by more than a third predetermined value; and responsive to a determination that the resource usage upper bound divided by the mean of the resource requests fails to exceed the first predetermined value, testing whether subtracting the resource usage upper bound divided by the mean of the resource requests from a fourth predetermined value yields a result that exceeds a fifth predetermined value.

18. The data processing system of claim 17, wherein determining, from the testing, the resource request adjustment comprises:

responsive to a determination that the resource usage upper bound divided by the mean of the resource requests exceeds the second predetermined value by more than the third predetermined value, setting the resource request adjustment to increase the resource requests;

responsive to a determination that subtracting the resource usage upper bound divided by the mean of the resource requests from the fourth predetermined value yields a result that exceeds the fifth predetermined value, setting the resource request adjustment to decrease the resource requests;

responsive to a determination that the resource usage upper bound divided by the mean of the resource requests fails to exceed the second predetermined value by more than the third predetermined value, setting the resource request adjustment to leave the resource requests unchanged; and responsive to a determination that subtracting the resource usage upper bound divided by the mean of the resource requests from the fourth predetermined value yields a result that fails to exceed the fifth predetermined value, setting the resource request adjustment to leave the resource requests unchanged.

19. The data processing system of claim 18, wherein setting the resource request adjustment to increase the resource requests comprises setting the resource request adjustment to increase the resource requests by a percentage equal to 100% multiplied by the lesser of (a) a sixth predetermined value and (b) a seventh predetermined value subtracted from the resource usage upper bound divided by the mean of the resource requests.

20. The data processing system of claim 18, wherein setting the resource request adjustment to decrease the resource requests comprises setting the resource request adjustment to decrease the resource requests by a percentage equal to 100% multiplied by the lesser of (a) an eighth predetermined value and (b) the resource usage upper bound divided by the mean of the resource requests subtracted from a ninth predetermined value.

21. A tangible, non-transitory computer-readable medium embodying instructions which, when implemented by at least one processor, cause the at least one processor to perform a method comprising:

monitoring, by a computer system, resource usage of at least one computer resource by an application executing in the dynamically scalable computing environment;

monitoring, by the computer system, resource requests for the at least one computer resource associated with the application;

determining, by the computer system, for the at least one computer resource, a resource usage upper bound associated with the application;

testing, by the computer system, the resource usage upper bound against at least one threshold;

determining, by the computer system, from the testing, a resource request adjustment; and the computer system dynamically applying the resource request adjustment to the resource requests for the at least one computer resource associated with the application;

wherein determining, for the at least one computer resource, a resource usage upper bound associated with the application comprises:

testing whether, during a predetermined time period, there have been a predetermined number of instances where the resource usage has exceeded a mean of the resource usage of the computer resource by the application plus a predetermined number of standard deviations of the resource usage of the computer resource by the application;

responsive to a determination that there have been a predetermined number of instances where the resource usage has exceeded a mean of the resource usage of the computer resource by the application plus a predetermined number of standard deviations of the resource usage of the computer resource by the application, setting the resource usage upper bound to a first predetermined percentage of a maximum resource usage of the computer resource by the application; and responsive to a determination that there have not been a predetermined number of instances where the resource usage of the computer resource by the application has exceeded a mean of the resource usage of the computer resource by the application plus a predetermined number of standard deviations of the resource usage of the computer resource by the application, setting the resource usage upper bound to a second predetermined percentage of the mean of the resource usage of the computer resource by the application.

22. The computer program product of claim 21, wherein testing the resource usage upper bound against at least one threshold derived from the resource requests comprises:

testing whether the resource usage upper bound divided by a mean of the resource requests exceeds a first predetermined value;

responsive to a determination that the resource usage upper bound divided by the mean of the resource requests exceeds the first predetermined value, testing whether the resource usage upper bound divided by the mean of the resource requests exceeds a second predetermined value that is greater than the first predetermined value by more than a third predetermined value; and responsive to a determination that the resource usage upper bound divided by the mean of the resource requests fails to exceed the first predetermined value, testing whether subtracting the resource usage upper bound divided by the mean of the resource requests from a fourth predetermined value yields a result that exceeds a fifth predetermined value.

23. The computer program product of claim 22, wherein determining, from the testing, the resource request adjustment comprises:

responsive to a determination that the resource usage upper bound divided by the mean of the resource requests exceeds the second predetermined value by more than the third predetermined value, setting the resource request adjustment to increase the resource requests;

responsive to a determination that subtracting the resource usage upper bound divided by the mean of the resource requests from the fourth predetermined value yields a result that exceeds the fifth predetermined value, setting the resource request adjustment to decrease the resource requests;

responsive to a determination that the resource usage upper bound divided by the mean of the resource requests fails to exceed the second predetermined value by more than the third predetermined value, setting the resource request adjustment to leave the resource requests unchanged; and responsive to a determination that subtracting the resource usage upper bound divided by the mean of the resource requests from the fourth predetermined value yields a result that fails to exceed the fifth predetermined value, setting the resource request adjustment to leave the resource requests unchanged.

24. The computer program product of claim 23, wherein setting the resource request adjustment to increase the resource requests comprises setting the resource request adjustment to increase the resource requests by a percentage equal to 100% multiplied by the lesser of (a) a sixth predetermined value and (b) a seventh predetermined value subtracted from the resource usage upper bound divided by the mean of the resource requests.

25. The computer program product of claim 23, wherein setting the resource request adjustment to decrease the resource requests comprises setting the resource request adjustment to decrease the resource requests by a percentage equal to 100% multiplied by the lesser of (a) an eighth predetermined value and (b) the resource usage upper bound divided by the mean of the resource requests subtracted from a ninth predetermined value.

\* \* \* \* \*